May 14, 1968 MASAHISA MIYAGI 3,383,599

MULTIPLE SUPERHETERODYNE DIVERSITY RECEIVER EMPLOYING NEGATIVE FEEDBACK

Filed Jan. 13, 1964 2 Sheets-Sheet 1

Inventor
M. MIYAGI
By [signature]
Attorney

Inventor
M. MIYAGI
By R P Morris
Attorney

United States Patent Office 3,383,599
Patented May 14, 1968

3,383,599

MULTIPLE SUPERHETERODYNE DIVERSITY RECEIVER EMPLOYING NEGATIVE FEEDBACK

Masahisa Miyagi, Minato-ku, Tokyo, Japan, assignor to Nippon Electric Company Limited, Tokyo, Japan, a corporation of Japan Filed Jan. 13, 1964, Ser. No. 337,396
Claims priority, application Japan, Feb. 7, 1963, 38/6,425
13 Claims. (Cl. 325—305)

ABSTRACT OF THE DISCLOSURE

This invention broadly teaches a diversity receiving system of high-sensitivity in which received signals are "angle modulated." To improve sensitivity of a receiving facility in which the phenomenon of multipath is present, a plurality of receiving antennas are provided spaced at predetermined intervals. Received signals are converted in first converter means under the control of a single master oscillator. The converted signals at each channel are then amplified, and then undergo a second conversion operation, each channel employing its own local oscillator to operate its associated second converter. The output of each second converter undergoes amplification, and all of these amplified outputs are then combined in a single combining circuit. A first feedback path is provided in each channel for coupling a portion of the finally amplified signal to adjust the operation of its associated local oscillator. The feedback path compares the second amplified output signal against the output of a single reference signal generator to provide the appropriate feedback signal.

Signals combined in the combining circuit are demodulated to provide a resultant output signal. A portion of this output signal is applied through a feedback path to control operation of the master oscillator.

A portion of the output signal of the combining circuit is also applied through a third feedback path to control the gain of the first amplification stage in each channel of the diversity receiver system.

This invention relates to equipment for multiple superheterodyne diversity reception of frequency-modulated waves and more particularly, to receiving equipment for use in microwave over-the-horizon communication equipment.

In diversity receiving equipment in which the receiver output signal is obtained by excluding faults (such as fading which adversely affect reception) from a plurality of received frequency-modulated waves, a signal combining circuit is provided in the intermediate-frequency stage or low-frequency stage. However, in microwave line-of-sight communication equipment, the diversity receiving equipment need not be highly sensitive because the strength of the received microwave is sufficient. The diversity receiving equipment for over-the-horizon communication equipment, on the other hand, must be as a whole, highly sensitive.

In receiving equipment for receiving angle (frequency or phase) modulated waves at high sensitivity (to which the principles of diversity reception are not applied), frequency-modulation negative feedback or phase-detection negative feedback has hitherto been adopted. It may be noted that both these forms of negative feedback utilize the same operational principles since frequency and phase modulations are the same in principle. For this reason the term "angle modulation" used hereinafter will be used as a generic term to indicate phase or frequency modulation. Highly sensitive receiving equipment utilizing frequency-modulated negative feedback generally include a frequency converter; an intermediate-frequency amplifier for amplifyingthe intermediate-frequency signal which is the output of the frequency converter; a demodulator, such as a frequency discriminator, for demodulating the output of the intermediate-frequency amplifier, and a variable-frequency local oscillator for supplying to the frequency converter a local oscillation signal whose frequency varies in response to a portion of the demodulator output. If desired, a gain control circuit may be coupled to the intermediate-frequency amplifier so as to eliminate those adverse effects which would otherwise be caused by variation in the received signal level. Inasmuch as the negative feedback is effected from the demodulator to the variable-frequency local oscillator so as to reduce the output of the demodulator with an increase in the demodulator output, the frequency band of the receiving equipment becomes narrower to provide high sensitivity reception. Also, the threshold level may be improved in a manner mentioned in the U.S. Patents Nos. 2,332,540 and 3,069,625.

High-sensitivity receiving equipment in which phase-detection negative feedback is adopted, generally includes a frequency converter accompanied by a local oscillator which produces a fixed-frequency local oscillation signal; an intermediate-frequency amplifier; a phase reference signal generator for generating a phase reference signal of a frequency substantially equal to the intermediate frequency; a phase detector or a phase difference detector for producing an output voltage which depends on the phase difference between the intermediate-frequency signal and the phase reference signal; and a connection connecting the phase detector and the phase reference signal generator so that the phase of the phase reference signal may vary in accordance with a portion of the output of the phase detector. In case the output voltage of the phase detector is small, the phase detector is followed by a baseband amplifier from whose output side the negative feedback is taken out. Inasmuch as the phase-detection negative feedback reduces the output of either the phase detector or the baseband amplifier with an increase of the output of such phase detector or baseband amplifier, the frequency band of the receiving equipment becomes substantially narrower to provide the high-sensitivity reception, as is the case with the frequency-modulation negative feedback. Furthermore, the phase-detection negative feedback is better suited to high-sensitivity reception since the phase reference generator introduces a phase reference signal having a small noise component or, in other words, a carrier with small noise component to raise the overall sensitivity of the receiving equipment.

In cases where the received carrier is not affected bv any fault, such as fading, and if diversity reception is not specifically required, then it is possible to achieve high-sensitivity reception by means of receiving equipment having only one channel for the received signal, which channel is provided with either frequency-modulation or phase-detection negative feedback means. In over-the-horizon reception equipment wherein the received wave is very weak and is subjected to faults, then a plurality of channels for the received signal together with the above-described negative feedback must be provided for the purpose of the diversity reception. For the simple case where there is only one channel for the received signal and where angle modulated negative feedback means are utilized, it is not too difficult to adjust the channel to have the desired sensitivity and to have the amount of negative feedback in the negative feedback loop remain constant with time. It is considerably more complicated however in the case where a plurality of such channels are provided to obtain diversity reception. The adjustment of the feedback in each of the respective channels to obtain optimum values can be quite complex. In particular, attention must be paid (in diversity reception equipment comprising a plurality of channels for the received signals wherein each channel is provided with the above-mentioned frequency-modulation negative feedback), to problems such as: the adjustment of each of the channels; and the maintenance of overall characteristics of the receiving equipment in the best condition over a long period of time, because the relative phase and gain relation between the channels strongly influences the overall characteristics of the receiving equipment. Such problems grow more serious with the increase of the multiplicity of diversity. Furthermore, another problem arises in the case where negative feedback is applied to the circuits for the intermediate frequency signal. In this latter case, the negative feedback enlarges the distortion of the resultant signal. Therefore, the number of the frequency-modulation negative feedback loops must be limited to as few as possible.

Meanwhile, each of the respective phases of the received signals as applied to the respective inputs of the signal combining circuit must be automatically controlled so that these phases coincide with each other, even if the signals are extremely weak and regardless of which form of angle modulator negative feedback is adopted for attaining high-sensitivity reception.

Therefore, the general object of this invention is to provide improved diversity reception equipment which is readily adjustable.

Another object of the invention is to provide diversity reception equipment for frequency-modulated waves wherein an angle modulated negative feedback circuit and an automatic phase control feedback circuit are provided in common to all of and in each of a plurality of channels for the received signals, respectively, to provide high-sensitivity reception.

The diversity receiving equipment of this invention comprises a plurality of channels for received signals, each channel in turn having a double or multiple superheterodyne receiver units; a signal combining circuit arranged in common for all the channels and adapted to combine the signals for such channels; and a demodulator; corresponding frequency conversion stages, one in each of the superheterodyne receiver units, are provided with a common local oscillator instead of the plurality of local oscillators usually provided; the common local oscillator is provided with frequency-modulation or phase-detection negative feedback by use of a portion of the demodulator output; at the same time another local oscillator for another frequency conversion stage in each of the receiver units is provided with automatic phase-control feedback within the individual signal channel. In short, the diversity receiving equipment of the invention is arranged so that the automatic phase control feedback may be utilized individually within each of the channels, while angle modulated negative feedback may be utilized in common to all the channels. It is therefore possible to eliminate all the above-mentioned problems caused by the frequency-modulation negative feedback loop. Specifically in the case where frequency-modulation negative feedback is utilized, the provision of a frequency-modulation negative feedback loop in common to all the channels for the received signals makes it very easy to adjust such negative feedback loop. If, furthermore, the signal combining circuit is in the intermediate-frequency stage, then provision of only the automatic phase control feedback means for each of the channels will not improve the threshold level. However, if frequency-modulation negative feedback is provided according to the invention, then improvement of the threshold level of the whole diversity receiving equipment results.

The above mentioned and other features and objects of this invention and the manner of attaining them will become more apparent and the invention itself will be best understood by reference to the following description of embodiments of the invention taken in conjunction with the accompanying drawings in which.

Figure 1:
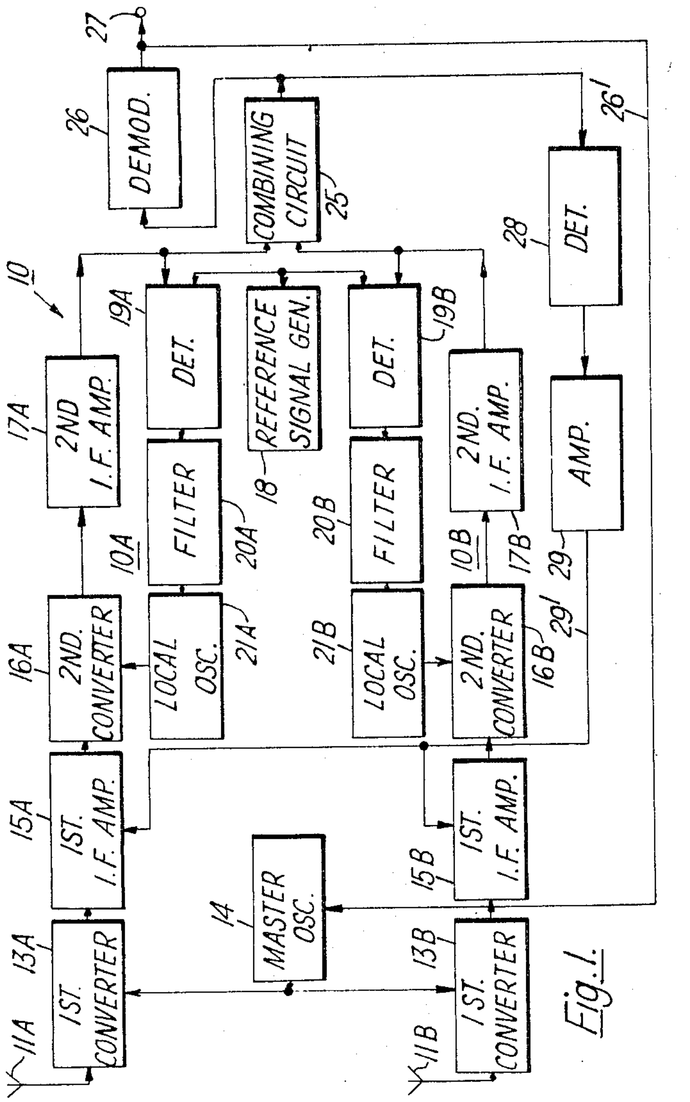
FIG. 1 is a block diagram of dual diversity receiving equipment having two channels and operating in accordance with this invention.

Referring at first to FIG. 1, the dual-diversity receiving equipment generally indicated at 10, is comprised of an antenna 11A for receiving an input microwave and a first double-superheterodyne receiver unit 10A which includes a first frequency converter 13A. This frequency converter 13A is supplied, from a master oscillator 14, with a local oscillation signal. The frequency of oscillator 14 will be discussed hereinafter. The first receiver unit 10A comprises after the first frequency converter 13A: a first intermediate-frequency amplifier 15A for amplifying a first intermediate-frequency signal which is the output of the converter 13A; a second frequency converter 16A for further converting the frequency of the output of the amplifier 15A; and a second intermediate-frequency amplifier 17A for amplifying a second intermediate-frequency signal which is the output of the second converter 16A. A portion of the output of the second intermediate-frequency amplifier 17A is fed to a phase detector or phase difference detector 19A, which is supplied with a phase reference signal at another input terminal thereof from a phase reference signal generator 18 and is adapted to derive the phase difference between the phase reference and the second intermediate-frequency signals. The output of the phase difference detector 19A is applied to a low-pass filter 20A to derive a control signal. The control signal is now sent to a local oscillator 21A for supplying to the second frequency converter 16A a local oscillation signal whose frequency varies with variations of the control signal. The second intermediate-frequency signal derived from the input microwave received by the antenna 11A is thus caused by the described receiver unit 10A to appear at the output terminal of the second intermediate-frequency amplifier 17A.

Likewise, another input microwave is received by another antenna 11B and applied to a second double superheterodyne receiver unit 10B at its first frequency converter 13B, which is supplied from the master oscillator 14 with the oscillation signal. In correspondence with the components of the first receiver unit 10A, the second receiver unit 10B comprises in succession to the first frequency converter 13B: a first intermediate-frequency amplifier 15B; a second frequency converter 16B; a second intermediate-frequency amplifier 17B; a phase difference detector 19B; a low-pass filter 20B; and a local oscillator 21B. The output of the second intermediate-frequency amplifier 17B is the second intermediate-frequency signal corresponding to the latter input microwave, as is the case with the first receiver unit 10A.

The output intermediate-frequency signals of the receiver units 10A and 10B obtained at the output terminals of their second intermediate-frequency amplifiers 17A and 17B are fed to the respective input terminals of an intermediate-frequency signal combining circuit 25 and combined thereat. The resultant signal is then demodulated at a demodulator 26 for the frequency-modulated wave. The demodulated signal is taken out at a receiver signal output terminal 27 connected to the demodulator 26. A portion of the output of the signal combining circuit 25 is also supplied (fed back) through an envelope detector 28, a control signal amplifier 29, and a line 29' to both of the first intermediate-frequency amplifiers 15A and 15B to provide automatic feedback control of the respective gains of these amplifiers 15A and 15B. A portion of the output of the demodulator 26 is fed back through a connection 26' to control the master oscillator 14 so as to vary the oscillation frequency thereof in accordance with the frequency modulated negative feedback signals.

In the receiving equipment 10, the feedback circuits leading from the output terminals of the second intermediate-frequency amplifiers 17A and 17B, through the respective circuits (including on the one hand the phase difference detector 19A and the low-pass filter 20A and on the other hand the phase difference detector 19B and the low-pass filter 20B), to the corresponding local oscillators 21A and 21B, are respective automatic phase control feedback circuits for the receiver units 10A and 10B. On the other hand, the feedback circuit leading from the demodulator 26, through lead 26′ to the master oscillator 14 is the frequency-modulation negative feedback circuit common to the receiver units 10A and 10B. If the demodulator 26 is one for demodulating the phase-modulated wave, the circuit leading from the demodulator 26 to the oscillator 14 serves as a phase-detecting negative feedback circuit.

Thus, it is obviously possible to automatically control the phases of the two second intermediate-frequency signals to be coincident, because each of the second frequency converter stages 16A and 16B of the receiver units 10A and 10B is provided with individual automatic phase control feedback means. Additionally, the sensitivity of reception can be simultaneously increased because the first frequency converter stages 13A and 13B of the receiver units 10A and 10B are provided with a common frequency-modulation or phase-detection negative feedback means. In addition, feedback (of the frequency-modulated or the phase-detected signals) from the demodulator 26 to the master 14 is very easily adjustable since such feedback regulates both of receiver units 10A and 10B.

Figure 2:
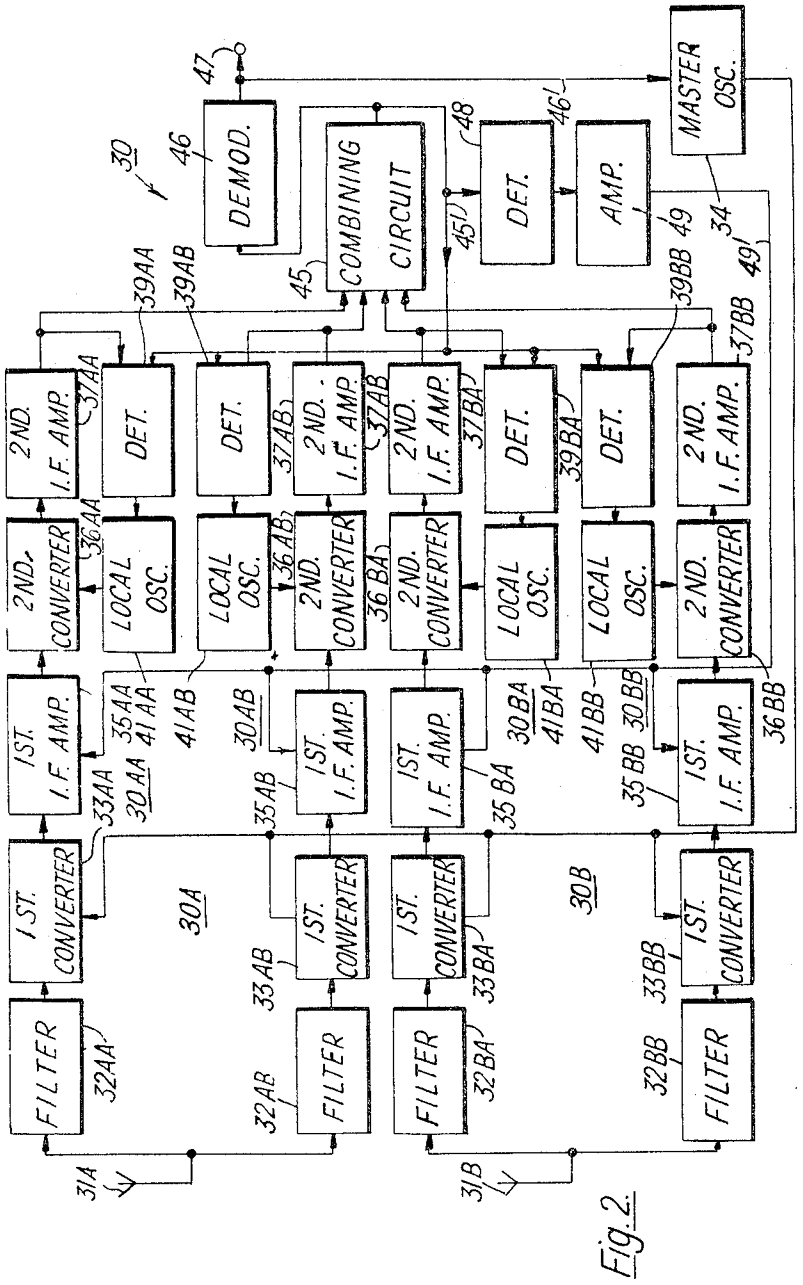
FIG. 2 is a block diagram of quadruple diversity receiving equipment having four channels and operating in accordance with this invention.

Referring now to FIG. 2, there is shown in block diagram form quadruple diversity receiving equipment 30. The receiving equipment 30 is arranged to provide quadruple diversity consisting of dual space diversity and dual frequency diversity. With the receiving equipment 30, the microwave signals are received by a pair of antennas 31A and 31B for space diversity reception. These signals are sent to a first receiver 30A consisting of a pair of frequency-diversity receiver units 30AA and 30AB and a second receiver 30B consisting of another pair of frequency-diversity receiver units 30BA and 30BB, respectively. The receiver units 30AA of the first receiver pair 30A comprises a first branching filter 32AA which may be supplied from (or be included in) the first antenna 31A; a first frequency converter 33AA for frequency-converting the output of the branching filter 32AA; a master oscillator 34 for supplying the converter 33AA with oscillation signals to be described hereinafter; a first intermediate-frequency amplifier 35AA for amplifying a first intermediate-frequency signal which is the output of the frequency converter 33AA; a second frequency converter 36AA for further frequency-converting the amplified first intermediate-frequency signal which is the output of the amplifier 35AA, and a second intermediate-frequency amplifier 37AA for amplifying a second intermediate-frequency signal derived as the output of the converter 36AA. A portion of the output of the second intermediate-frequency amplifier 37AA is supplied (fed back) to a phase difference detector 39AA. This detector 39AA is also connected through lead 45′ to a phase reference signal supplied from the output terminal of an intermediate-frequency signal combining circuit 45 whose operation will be described hereinafter. The detector 39AA operates in a manner similar to the phase difference detectors 19A and 19B of FIG. 1 which are supplied with the phase reference signal from the phase reference signal generator 18, to detect the phase difference of the amplified second intermediate-frequency signal based on the phase reference signal. The output of the phase difference detector 39AA is delivered as a control signal to a local oscillator 41AA which in turn supplies the second frequency converter 36AA with a local oscillation signal whose frequency varies with the control signal. As will be apparent from the construction, a combined intermediate-frequency signal obtained from the signal combining circuit 45 is used as the phase reference signal in the receiving equipment 30. Alternatively, a phase reference signal generator such as generator 18 of FIG. 1, may be utilized in each of the receiver pairs 30A and 30B instead of feeding back signals along lead 45′. Like the low-pass filter 20A or 20B in the receiving equipment 10 of FIG. 1, a low-pass filter (not shown in FIG. 2) is preferably interposed between the phase difference detector 39AA and the second local oscillator 41AA. The second intermediate-frequency signal corresponding to that portion of the microwave signals received by the antenna 31A which was selected by the branching filter 32AA is obtained from the output side of the second intermediate-frequency amplifier 37AA.

Likewise, another second intermediate-frequency signal (corresponding to that portion of the microwave signal received by the antenna 31A which may have been separated by a second branching filter 32AB of the first receiver pair 30A) is obtained at the output terminal of the second I.F. amplifier 37AB of the receiver unit 30AB. The blocks of receiver 30AB are in correspondence with the components of the receiver unit 30AA as follows: a first frequency converter 33AB succeeding the separation network 32AB; a first intermediate-frequency amplifier 35AB; a second frequency converter 36AB; a second intermediate-frequency amplifier 37AB; a phase difference detector 39AB. Detector 39AB receives a portion of the output signal from amplifier 37AB along with a reference signal along lead 45′ from combining circuit 45; a local oscillator 41AB is connected to and controlled by detector 39AB; the output of local oscillator 41AB in turn is supplied to converter 36AB.

Inasmuch as the construction and the operation of the second receiver pair 30B is substantially the same as the first receiver pair 30A, the paired receiver units 30BA and 30BB will merely be illustrated in the drawing by changing the first reference letter succeeding the reference numeral from A to B. It is therefore to be understood that those references of the components of the first and second receiver pairs 30A and 30B which differ from each other only by the first reference letter following the reference numeral, show the fact that the components bearing such references correspond to each other.

The second intermediate-frequency signals of the receiver units 30AA, 30AB, 30BA, and 30BB obtained from the respective second intermediate-frequency amplifiers 37AA, 37AB, 37BA, and 37BB are fed to the respective input terminals of the intermediate-frequency signal combining circuit 45 to be combined therein and then demodulated at a demodulator 46 for a frequency-modulated wave, to be taken out at a signal output terminal 47. A portion of the output of the signal combining circuit 45 is supplied (fed back) through the connection 45′ to all of the phase difference detectors 39AA, 39AB, 39BA, and 39BB as the phase reference signal. Another portion of the output of the signal combining circuit 45 is supplied through an envelope detector 48, a baseband amplifier 49, and a connection 49′, to all of the first intermediate-frequency amplifiers 35AA, 35AB, 35BA, and 35BB as the automatic gain control signal. A portion of the output of the demodulator 46 is fed back through the connection 46′ back to the master oscillator 34 to supply oscillation signal to all of the first frequency converters 33AA, 33AB, 33BA, and 33BB. The frequency of this local oscillation signal is varied in accordance with the frequency modulated negative feedback signals.

In the receiving equipment 30 so for explained, the circuits leading from the output terminals of the second intermediate-frequency amplifiers 37AA, 37AB, 37BA, and 37BB, through the respective phase difference detectors 39AA, 39AB, 39BA, and 39BB, to the respective local oscillators 41AA, 41AB, 41BA, and 41BB are the feedback circuits for the automatic phase control of the receiver units 30AA, 30AB, 30BA, and 30BB, respectively. The circuit leading from the demodulator 46 through the connection 46′ to the master oscillator 34 is the frequency-modulation negative feedback circuit which is common to all the receiver units 30AA, 30AB, 30BA, and 30BB. If the demodulator 46 is for phase-modulated signals, the circuit leading from the demodulator 46 to the master oscillator 34 is a phase-detection negative feedback circuit as was the case with the receiving equipment 10 of FIG. 1.

As will be understood from the above, the receiving equipment 30 is not only provided with automatic phase control feedback in each of the second frequency-conversion stages of the respective receiver unit 30AA, 30AB, 30BA, and 30BB, but is also provided with (either the frequency-modulation or the phase-detection) negative feedback control means which is in common to all of the first frequency-conversion stages of such uits 30AA, 30AB, 30BA, and 30BB to facilitate high-sensitivity reception. In spite of the four receiver units 30AA, 30AB, 30BA, and 30BB involved, the receiving equipment 30 is easily adjustable because one negative feedback loop in common to all receiver units, is required.

Although the receiving equipment 30 of FIG. 2 is arranged so that each of the microwave signals received by space-diversity antennas 31A and 31B, respectively, is first supplied to the branching filter and then to the first frequency converters, the microwave signals received by the antennas 31A and 31B may alternatively be, first frequency-converted, to become the first intermediate-frequency signals, respectively, and then each of the resulting four first intermediate-frequency signals may be dealt with in an individual channel for the received signal. Even in such an alternative arrangement, the (frequency modulation or the phase-detection) negative feedback should be applied to the first frequency-conversion stages in common to all the four channels, while the automatic phase control feedback should individually be applied to each of the second frequency-conversion stages.

While the invention has mainly been explained in conjunction with two embodiments thereof, the invention is not limited to such specific embodiments but may be put to practice in a number of ways without departing from the spirit thereof. For example, the superheterodyne receiver units which serve as the channels for the received signal may be triple or more multiple superheterodyne receiver units; the signal combining circuit may be in the baseband-frequency stage instead of the I.F. stage, and the multiplicity of the diversity reception may be more than four and may be sextuple, octuple, or more.

While I have described above the principles of my invention in connection with specific embodiments, it is to be clearly understood that this description is made only by way of example and not as a limitation to the scope of my invention as set forth in the objects thereof and in the accompanying claims.

What is claimed is:

1. In multiple superheterodyne high sensitivity diversity receiving apparatus in which received signals are supplied to the input terminals of a plurality of parallel connected channels, each channel including an output terminal, at least first and second serially connected frequency converter stages being arranged such that the input of the first stage is connected to said input terminal, and the output of the second stage is connected to an output terminal and a phase control feedback loop coupled to an associated output terminal for feeding back a portion of the signals in the channel to a converter stage other than said first converter; and wherein combining means are provided for combining the outputs of said channels, the improvement comprising: common feedback means connected to feed back a portion of the output signal of said combining means to the first converter stage in each channel to control the angle modulation of all the channels simultaneously.

2. Multiple superheterodyne diversity receiving apparatus for high sensitivity reception comprising:

(a) a plurality of channels connected in parallel, each channel including:
  (a–1) an input and an output terminal,
  (a–2) at least first and second serially connected frequency converter stages connected between an associated input and output terminal such that the first stage is nearer the input terminal,
  (a–3) a phase control feedback loop, for providing separate automatic phase control for each channel, connected to an associated output terminal to feed back a portion of the signals in the channel to a converter stage in said channel other than said first stage;
(b) means for applying received signals to said input terminals;
(c) combining means connected to the output terminal of each channel for producing combined output signals indicative of the channel output signals;
(d) and common feedback means connected to feed back a portion of the combined output signal to the said first converter stage in each channel, to control the angle modulation of all the channels simultaneously.

3. Multiple superheterodyne diversity receiving apparatus as set forth in claim 2 in which a demodulator is provided and connected to receive and demodulate the combined output signals and wherein the common feedback means are connected to feed back a portion of the demodulated combined output signals to said first converter stage in each channel.

4. Multiple superheterodyne diversity receiving apparatus as set forth in claim 3 in which the channels are arranged to be substantially identical to each other, each having the same number of converter stages with the automatic phase control feedback means connected to feed back signals to a correspondingly positioned converter stage in each channel.

5. Multiple superheterodyne diversity receiving apparatus as set forth in claim 2 wherein the combined output signals are frequency modulated signals.

6. Multiple superheterodyne diversity receiving apparatus as set forth in claim 2 wherein the combined output signals are phase modulated signals.

7. Multiple superheterodyne diversity receiving apparatus as set forth in claim 2 wherein the phase control feedback loop in each channel includes a detector and a phase reference signal source connected to said detector, the detector detecting the difference between the reference signals and the feedback signals.

8. Multiple superheterodyne diversity receiving apparatus as set forth in claim 7 wherein only one phase reference signal source is provided and connected to supply reference signals simultaneously to the detectors in all channels.

9. Multiple superheterodyne diversity receiving apparatus as set forth in claim 3 wherein the phase control feedblack loop in each channel includes a detector and wherein the combined output signals are supplied to the detector in each channel, the detector producing detector output signals in response to the difference between the combined output signals and the feedback signals.

10. Multiple superheterodyne diversity receiving apparatus as set forth in claim 2 wherein a master oscillator is provided and connected into said common feedback means, the common feedback signals controlling the output of said master oscillator, and wherein the output of said oscillator is connected to the first frequency converter in each channel.

11. Multiple superheterodyne diversity high sensitivity receiving apparatus comprising:

(a) a plurality of identical channels connected in parallel, each channel including:
  (a–1) an input and an output terminal, (a–2) at least first and second frequency converter stages, (a–2–a) the first stage in each channel being connected nearest the input terminal, (a–2–b) the number of stages in each of the channels being equal, (a–3) a phase control feedback loop for providing separate automatic phase control for each channel connected to feed back a portion of the signals in the channel to a converter stage other than said first converter, (a–3–a) said phase control feedback loop including a detector;

(b) means for supplying received signals to the input terminal of each channel;

(c) combining means connected to the output terminal of each channel for producing a combined output signal indicative of the channel output signals;

(c–1) the combined signal output being supplied to the detectors in the phase control feedback loops of said channels, the detector in each channel detecting the difference between said combined output signals and the feedback signals in said channel.

(d) a demodulator connected to receive and demodulate the combined output signals;

(e) and common feedback means connected to feed back a portion of the demodulated signals to the first converter stage in each channel, (e–1) the common feedback means including a master oscillator controlled by the common feedback signals and connected to said first converter stages, the frequency of said master oscillator controlling the angle modulation of all the channels simultaneously.

12. Multiple superheterodyne diversity receiving apparatus having high sensitivity to low threshold signals comprising:

(a) a plurality of channels arranged in parallel, each of said channels including:

(a–1) an input and an output terminal; a first converter stage coupled to receive signals from its associated input terminal;

(a–2) first I.F. amplifier means for amplifying signals received from said first converter means;

(a–3) second converter means for receiving signals from said first I.F. amplifier; and delivering converted signals to its associated output terminal;

(a–4) local variable output frequency oscillator means coupled to control its associated second converter means;

(a–5) detector means receiving a portion of the signal appearing at its associated output terminal for controlling its associated local variable output frequency means to provide phase control feedback operation;

(b) combiner means coupled to receive signals appearing at all of said output terminals;

(c) demodulator means coupled to said combiner means for demodulating the combiner means output;

(d) adjustable master oscillator means coupled to control the operation of each first converter means;

(e) second feedback means coupling a portion of said demodulator means output to adjust the operating frequency of said master oscillator means.

13. The diversity receiving system of claim 12 further comprising third feedback means for coupling a portion of the combiner means output signal to each of said first I.F. amplifier means for automatic gain control thereof.

References Cited

UNITED STATES PATENTS

| | | | |
|---|---|---|---|
| 2,332,540 | 10/1943 | Travis | 329—124 |
| 2,955,199 | 10/1960 | Mindes | 325—305 |
| 2,975,275 | 3/1961 | Adams | 325—305 |
| 3,001,068 | 9/1961 | Morita et al. | 325—346 |
| 3,069,625 | 12/1962 | Morita et al. | 329—124 X |
| 3,069,630 | 12/1962 | Adams et al. | 325—305 |
| 3,195,049 | 7/1965 | Altman et al. | 325—305 |

KATHLEEN H. CLAFFY, *Primary Examiner.*

R. S. BELL, *Assistant Examiner.*